United States Patent [19]

Nakayama et al.

[11] Patent Number: 4,538,079
[45] Date of Patent: Aug. 27, 1985

[54] FLYWHEEL DEVICE WITH COMPENSATION FOR NON PARALLEL PLATES

[75] Inventors: Taesuke Nakayama, Kobe; Tadashi Konishi, Akashi, both of Japan

[73] Assignee: Mitsubishi Denki Kabushiki Kaisha, Tokyo, Japan

[21] Appl. No.: 600,403

[22] Filed: Apr. 16, 1984

[51] Int. Cl.³ .............................................. H02K 7/02
[52] U.S. Cl. ...................................... 310/74; 310/51; 310/157; 74/572
[58] Field of Search .................... 310/51, 74, 157; 74/572, 573 R; 322/4; 280/217; 416/60

[56] References Cited

U.S. PATENT DOCUMENTS 3,368,424  2/1968  Clerk ........................................ 74/572
3,788,162  1/1974  Rabenhorst ............................ 74/572
4,186,245  1/1980  Gilman ................................. 74/572 X

FOREIGN PATENT DOCUMENTS 0016271  1/1981  Japan ..................................... 74/572
0016272  1/1982  Japan ..................................... 74/572
0061346  4/1983  Japan ..................................... 74/572

Primary Examiner—Mark O. Budd
Attorney, Agent, or Firm—Wenderoth, Lind & Ponack

[57] ABSTRACT

The present invention relates to a flywheel device comprised of a plurality of flywheel discs axially stacked one upon the other and interconnected by a plurality of tightening bolts. The flywheel discs act as a flywheel in their entirety and are connected to an intermediate shaft. The tightening bolts are passed through the periphery of the stacked up discs. According to the invention, an adjustment disc is introduced between the intermediate shaft and the stacked up discs and is subjected to a facing operation so that a connecting surface of the adjustment disc with the intermediate shaft compensates for any deviation caused by an accumulated dimensional error of the stacked up discs.

5 Claims, 3 Drawing Figures

FLYWHEEL DEVICE WITH COMPENSATION FOR NON PARALLEL PLATES

BACKGROUND OF THE INVENTION

1. Field of the Invention

This invention relates to a flywheel device which is directly coupled to an electric generator provided with electrically activated starting means. More particularly, it relates to such a flywheel device according to which electrical energy is converted into and stored as an inertial energy of a rotating body, which inertial energy can be reconverted into and supplied as electrical energy whenever the occasion demands.

2. Description of the Prior Art

Certain prior art flywheel devices of the above described type are directly coupled to an electric generator operatively linked to a separate starting electric motor. Other flywheel devices of the same type are directly coupled to a motor-generator, i.e. a dynamo-electric device which may be employed selectively as the starting electric motor or as the electric generator through use of stationary thyristor starting means. In both of these cases, the diameter of the flywheel device is necessarily increased in order to achieve a large inertial effect so that the overall weight of the device occasionally reaches hundreds of tons.

Hence, the recent tendency is towards adopting a vertical shaft type device rather than a horizontal shaft type device, in order to avoid shaft flexure, save floor space, and to reduce excessive noise.

In the following description of the prior art device and a preferred embodiment of the present invention, the electric generator provided with electrically activated starting means is the dynamoelectric device or motor-generator defined above.

The conventional flywheel device which is directly coupled to the vertical shaft type motor-generator is shown in a longitudinal section in FIG. 1.

Referring to FIG. 1, the numeral 1 designates a motor-generator. The numeral 2 designates a rotor having a yoke attached to an intermediate shaft 3. To the circular outer periphery of the yolk of the rotor 2, there is attached a plurality of field poles. An upper shaft 4 is directly coupled to the intermediate shaft 3 and has attached thereto slip rings 5 adapted for conducting exciting current from an exterior exciter or thyristor starting device, not shown. A stator 6 is supported by a stator frame 8 and carries a stator winding on a stator iron core 7. An upper guide bearing 9 is supported by an upper bracket 10 and is adapted for radially supporting the upper shaft 4. An intermediate guide bearing 11 is supported by an intermediate bracket 12 and radially supports the intermediate shaft 3.

Directly coupled to the underside of the intermediate shaft 3 by any suitable means as by bolts is a flywheel device 13 which is comprised of a plurality of solid discs 14 clamped together by a plurality of tightening bolts 15.

A thrust collar 16 is attached to the lower end of the flywheel device 13. A thrust bearing 17 is adapted for carrying the total weight of a rotating portion consisting essentially of the rotor 2 and the flywheel device 13. In FIG. 1 the numeral 18 designates a lower guide bearing for radially supporting the thrust collar 16, the numeral 19 a lower bracket for supporting the lower guide bearing 18 and the thrust collar 16, and the numeral 20 a foundation of iron reinforced concrete.

In the operation of the motor-generator coupled flywheel device, the motor-generator 1 is started as the electric motor by the excitation current supplied from the thyristor starting device. In this manner, the flywheel device 13 is accelerated to its rated r.p.m. and thus a rotational inertial energy is stored in the device 13. The motor-generator 1 is operated as the electric generator whenever it becomes necessary to supply an electrical energy converted from the inertial energy.

Thus, in order to store a large energy, it is necessary to use a flywheel device of larger diameter and weight. In addition, since a unitary disc of a larger weight is extremely inconvenient with regard to transport and manufacture, the disc is divided into plural disc portions of smaller thickness stacked horizontally one upon the other.

On the other hand, rotation of the rotor 2 of the motor-generator 1 is deviated from rotation about the rotor axis to the extent that the surface of the flywheel device 13 disposed below the motor-generator 1 is deviated from the horizontal axis. Thus, it is required that each disc of the larger diameter and weight mass be machined within a narrow tolerance.

The prior art flywheel device has a drawback that, since the motor-generator 1 is mounted on the flywheel device 13, it is required that each flywheel disc 14 be machined within a narrow tolerance in order that the deviation of the rotor rotation from the rotation about the rotor axis be maintained within allowable limits, and that, even though each flywheel disc 14 could be machined within the narrow tolerance, it is not always possible to maintain the deviation of the general plane or surface of the flywheel disc 14 from the horizontal axis within allowable limits at the time that the discs 14 are stacked ultimately in position below the motor-generator 1.

SUMMARY OF THE INVENTION

This invention has been made in order to obviate the above described drawbacks of the prior art device. It is contemplated by the present invention to provide a flywheel device 13 in which deviation of the surface of the flywheel device 13 from the horizontal axis may be easily corrected by means of an adjustment disc introduced between the intermediate shaft 3 and the flywheel device 13.

BRIEF DESCRIPTION OF THE DRAWINGS

In the drawings, the same numerals are used to depict same or equivalent parts.

DESCRIPTION OF THE PREFERRED EMBODIMENT

Figure 1:
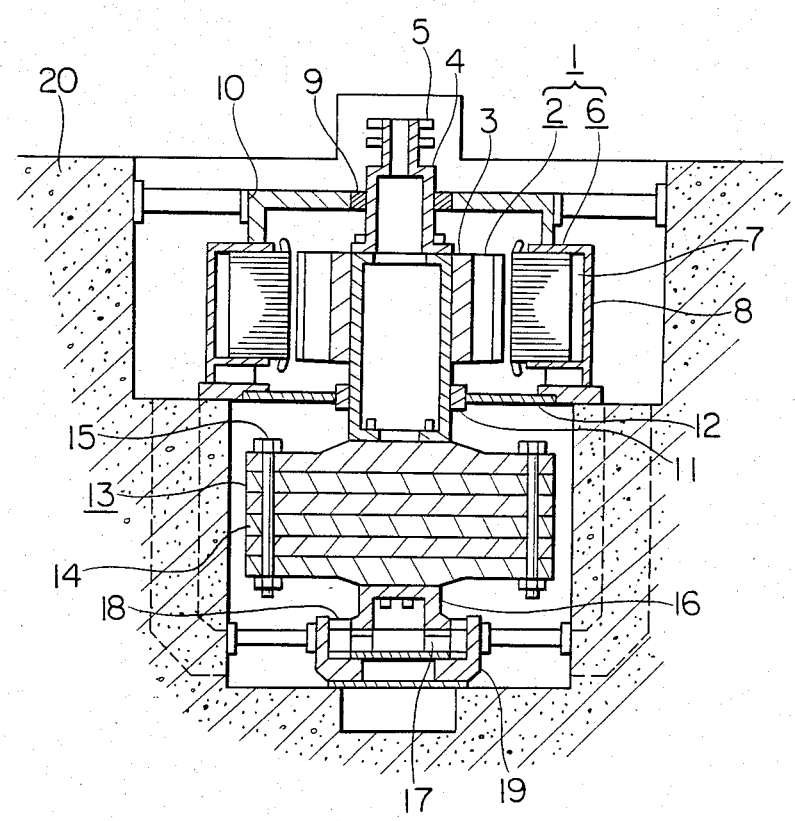
FIG. 1 shows in longitudinal section a prior-art flywheel device and the motor-generator directly coupled thereto.

A preferred embodiment of the present invention is described by referring to the drawings.

Figure 2:
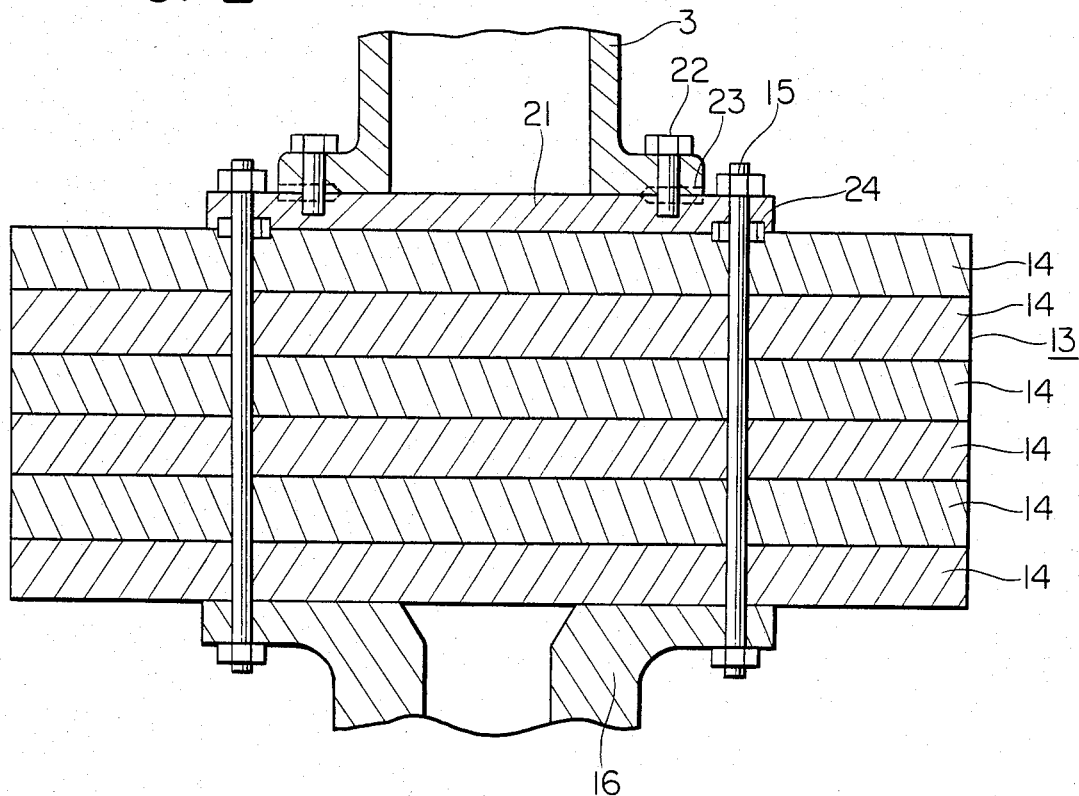
FIG. 2 shows in longitudinal section a preferred embodiment of the flywheel device according to the present invention.

Referring to FIG. 2, an adjustment disc 21 is interposed in a connecting zone between an intermediate shaft 3 and a flywheel device 13. The disc 21 is tightened and secured to the intermediate shaft 3 by a plurality of tightening bolts 22. Radial knock pins 23 are adapted for transmitting torque from the intermediate shaft 3 to the flywheel device 13. The adjustment disc 23 and the flywheel device 13 are coupled to each other by a plurality of tightening bolts 15. Between the disc 21 and the flywheel device 13 are introduced a plurality of cylindrical rings 24 adapted for transmitting torque from the intermediate shaft 3.

In the present embodiment, in correcting deviation of the flywheel device from the horizontal axis, the degree of machining precision of each flywheel disc 14 is determined in advance and the various discs 14 are then assorted in such a manner that the deviation from the horizontal axis of the upper surface of the topmost disc 14 in minimized.

The adjustment disc 21 is then machined in such a manner that the deviation from the horizontal axis of the upper surface of the topmost disc 14 is within allowable limits. Thereafter, the adjustment disc 21 is tightened together with the flywheel device 13 by means of the tightening bolts 15, and the deviation from the horizontal axis of the surface of the adjustment disc 21 is measured. Fine adjustment is then performed by a manual machining operation so that the deviation of the disc 21 from the horizontal axis is within allowable limits.

Figure 3:
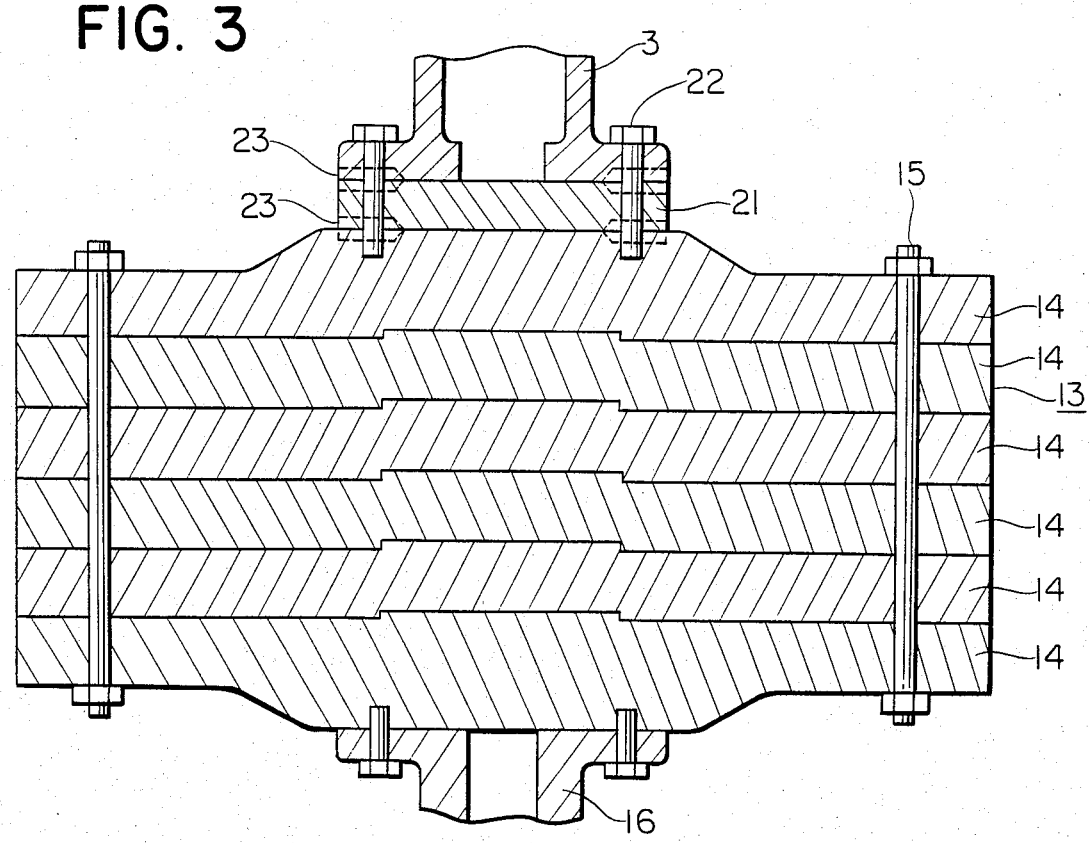
FIG. 3 shows in longitudinal section a modified embodiment of the flywheel device according to the present invention.

FIG. 3 shows a modified embodiment of the invention wherein the adjustment disc 21 is not tightened by bolts 15 used for tightening the flywheel discs 14, but by bolts 22, so that the disc 21 is tightened together with the intermediate shaft 3. In the present embodiment, the cylindrical rings 24 shown in FIG. 2 may be dispensed with.

The present invention is not limited to the above embodiments, but may comprise a number of modifications without departing from the purpose of the invention.

It is thus seen that the flywheel device 13 of the present invention makes use of the adjustment disc 21 introduced between the flywheel device 13 and the shaft 3, whereby the intermediate accumulated dimensional error may be ultimately compensated at the adjustment disc 21 and the deviation of the flywheel device 13 from the horizontal axis may be minimized.

What is claimed is:

1. A flywheel device having a horizontal axis, comprising:
a plurality of flywheel discs axially stacked one upon the other, with a topmost disc on top of said discs having top surfaces substantially parallel to the horizontal axis of the flywheel device;
a first plurality of bolt means for tightening the plurality of flywheel discs together;
an adjustment disc arranged on top of the plurality of flywheel discs, said adjustment discs having a top surface parallel to the horizontal axis of the flywheel device and having a bottom surface in contact with a top surface of the topmost disc of the plurality of flywheel discs;
a shaft having a flange;
a second plurality of bolt means for connecting the flange of the shaft to the adjustment disc; and
radial knock pin means, arranged between the shaft and the adjustment disc, for transmitting torque from the shaft through the adjustment disc to the plurality of flywheel discs;
whereby the top surface of the adjustment disc corrects the accumulated dimensional error of the stacked plurality of flywheel discs from the horizontal axis of the flywheel device.

2. The flywheel device as claimed in claim 1 characterized in that the shaft is that of an electric generator.

3. The flywheel device as claimed in claim 2 characterized in that the shaft is arranged vertically and the generator is erected on the flywheel device.

4. The flywheel device according to claim 1, wherein:
said first plurality of bolt means also tightens the adjustment disc to the plurality of flywheel discs.

5. The flywheel device according to claim 1 wherein:
said second plurality of bolt means also connects the adjustment disc to the plurality of flywheel discs.

* * * * *